United States Patent
Babu et al.

(10) Patent No.: US 11,181,379 B2
(45) Date of Patent: Nov. 23, 2021

(54) SYSTEM AND METHOD FOR ENHANCING NON-INERTIAL TRACKING SYSTEM WITH INERTIAL CONSTRAINTS

(71) Applicant: Robert Bosch GmbH, Stuttgart (DE)

(72) Inventors: Benzun Pious Wisely Babu, San Jose, CA (US); Mao Ye, San Jose, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 253 days.

(21) Appl. No.: 16/569,024

(22) Filed: Sep. 12, 2019

(65) Prior Publication Data
US 2021/0080259 A1  Mar. 18, 2021

(51) Int. Cl.
*G01C 21/16* (2006.01)
*H04L 29/08* (2006.01)

(52) U.S. Cl.
CPC ............ *G01C 21/165* (2013.01); *H04L 67/12* (2013.01)

(58) Field of Classification Search
CPC ........ G01C 21/165; H04L 67/12; G01S 17/86
See application file for complete search history.

(56) References Cited

U.S. PATENT DOCUMENTS

| | | | |
|---|---|---|---|
| 9,555,883 B1 | 1/2017 | Navot et al. | |
| 9,846,042 B2 | 12/2017 | Babu et al. | |
| 2013/0335554 A1 | 12/2013 | Brunner et al. | |
| 2016/0055673 A1* | 2/2016 | Broaddus | G06T 19/006 |
| | | | 345/633 |

FOREIGN PATENT DOCUMENTS

JP   2019074532 A   5/2019

OTHER PUBLICATIONS

Siegwart, Roland, Illah Reza Nourbakhsh, and Davide Scaramuzza. Introduction to autonomous mobile robots. MIT press, 2011.
Mourikis, Anastasios I., and Stergios I. Roumeliotis. "A Multi-State Constraint Kalman Filter for Vision-aided Inertial Navigation." (2006).
Zhang, Ji, and Sanjiv Singh. "LOAM: Lidar Odometry and Mapping in Real-time." (2014).
Lupton, Todd, and Salah Sukkarieh. "Visual-inertial-aided navigation for high-dynamic motion in built environments without initial conditions." IEEE Transactions on Robotics 28.1 (2011): 61-76.
Leutenegger, Stefan, et al. "Keyframe-based visual-inertial odometry using nonlinear optimization." (2015).

(Continued)

*Primary Examiner* — Manuel A Rivera Vargas
(74) *Attorney, Agent, or Firm* — Brooks Kushman P.C.

(57) ABSTRACT

A system and method for generating a tracking state for a device includes synchronizing measurement data from exteroceptive sensors and an inertial measurement unit (IMU). A processing unit is programmed to offset one of the measurement signals by a time offset that minimizes a total error between a change in rotation of the device predicted by the exteroceptive sensor data over a time interval defined by an exteroceptive sensor sampling rate and a change in rotation of the device predicted by the IMU sensor data over the time interval.

20 Claims, 6 Drawing Sheets

(56) References Cited

OTHER PUBLICATIONS

Jones, Eagle S., and Stefano Soatto. "Visual-inertial navigation, mapping and localization: A scalable real-time causal approach." The International Journal of Robotics Research 30.4 (2011): 407-430.

Sukkarieh, Salah, Eduardo Mario Nebot, and Hugh F. Durrant-Whyte. "A high integrity IMU/GPS navigation loop for autonomous land vehicle applications," IEEE Transactions on Robotics and Automation 15.3 (1999): 572-578.

Rahman, Sharmin, Alberto Quattrini Li, and Ioannis Rekleitis. "Sonar Visual Inertial SLAM of underwater structures." 2018 IEEE International Conference on Robotics and Automation (ICRA). IEEE, 2018.

M. Bloesch, S. Omari, M. Hutter, and R. Siegwart, "Robust visual inertial odometry using a direct EKF-based approach," (2015).

Bay, Herbert, et al. "Speeded-up robust features (SURF)." Computer vision and image understanding 110.3 (2008): 346-359.

Rosten, Edward, and Tom Drummond. "Machine learning for high-speed corner detection." (2006).

Shi, Jianbo, and Tomasi, Carlo. "Good features to track." 1994 Proceedings of IEEE conference on computer vision and pattern recognition. IEEE, 1994.

Neira, José, and Juan D. Tardós. "Data association in stochastic mapping using the joint compatibility test." IEEE Transactions on robotics and automation 17.6 (2001): 890-897.

Davison, Andrew J., et al. "MonoSLAM: Real-time single camera SLAM." IEEE Transactions on Pattern Analysis & Machine Intelligence 6 (2007).

Civera, Javier, et al. "1—Point RANSAC for extended Kalman filtering: Application to real-time structure from motion and visual odometry." (2010).

Hartley, Richard I. "In defense of the eight-point algorithm." IEEE Transactions on pattern analysis and machine intelligence 19.6(1997): 580-593.

Kneip, Laurent, Davide Scaramuzza, and Roland Siegwart. "A novel parametrization of the perspective-three-point problem for a direct computation of absolute camera position and orientation." (2011).

Nistér, David. "An efficient solution to the five-point relative pose problem." IEEE transactions on pattern analysis and machine intelligence 26.6 (2004): 0756-777.

Konolige, Kurt, and Motilal Agrawal. "FrameSLAM: From bundle adjustment to real-time visual mapping." IEEE Transactions on Robotics 24.5 (2008): 1066-1077.

Sibley, Gabe, et al. "Vast-scale outdoor navigation using adaptive relative bundle adjustment." The International Journal of Robotics Research 29.8 (2010): 958-980.

Nikolic, Janosch, et al. "A synchronized visual-inertial sensor system with FPGA pre-processing for accurate real-time SLAM." (2014).

Mair, Elmar, et al. "Spatio-temporal initialization for IMU to camera registration." (2011).

Qin, Tong, and Shaojie Shen. "Online temporal calibration for monocular visual-inertial systems." arXiv preprint arXiv:1808.00692 (2018).

Kelly, Jonathan, and Gaurav S. Sukhatme. "A general framework for temporal calibration of multiple proprioceptive and exteroceptive sensors." (2014).

Forster, Christian, et al. "On-Manifold Preintegration for Real-Time Visual-Inertial Odometry." IEEE Transactions on Robotics (2016).

Hesch, Joel A., et al. "Camera-IMU-based localization: Observability analysis and consistency improvement." The International Journal of Robotics Research 33.1 (2014): 182-201.

Furgale, Paul, Joern Rehder, and Roland Siegwart. "Unified temporal and spatial calibration for multi-sensor systems." (2013).

Sweeney, Chris, et al. "Efficient computation of absolute pose for gravity-aware augmented reality." (2015).

* cited by examiner

SYSTEM AND METHOD FOR ENHANCING NON-INERTIAL TRACKING SYSTEM WITH INERTIAL CONSTRAINTS

TECHNICAL FIELD

This application generally relates to system for enhancing a non-inertial tracking system with inertial measurements.

BACKGROUND

Spatial localization is used in robotics and augmented reality for tracking ego motion of the devices. In augmented reality, accurate tracking enables realistic augmentation of virtual content as the user moves through the environment. Similarly, in robotics, tracking enables the ability to infer the spatial relationship between the robot and the environment and thus enable interactions. The tracking system forms an integral part of Augmented Reality (AR) and Virtual Reality (VR) devices such as Hololens, Magic Leap, Occulus Rift, HTC Vive etc., as well as robotics systems such as Roomba, Pepper, etc.

Tracking systems employ different sensors to make observations of the environment and to infer about the position and orientation (states) of the device. The sensors used for tracking can be broadly classified as exteroceptive or proprioceptive. Exteroceptive sensors, such as cameras, LIDAR (laser imaging, detection, and ranging sensor), and sonar, enable observation of motion based on measurements from the external world. Proprioceptive sensors, such as an Inertial Measurement Unit (IMU), and odometer, enable observation of the motion based on measurements internal to the system or device. In recent years, "inside-out tracking" which is performed without any sensors external to the device has gained popularity. The selection of the exteroceptive sensor is mainly based on the environment and application use cases while the most commonly used proprioceptive sensor is the IMU.

SUMMARY

A controller-based method for tracking position and orientation of a device includes predicting a first tracking state of the device using measurements from an exteroceptive sensor (ES) sampled at a first rate and generating a second tracking state of the device using measurements from an inertial measurement unit (IMU) sampled at a second rate that is asynchronous to the first rate. The method further includes synchronizing the first and second tracking states to a common time domain by estimating a time offset that minimizes an error between changes over time between the first and second tracking states such that a first time series associated with the first tracking state and a second time series associated with the second tracking state are aligned in time. The method further includes aligning the first tracking state and the second tracking state to an inertial reference frame and generating an inertial-aided tracking state by minimizing a cost function that includes a first residual term derived from propagating a previous state estimate using the second tracking state shifted by the time offset and a second residual term derived from the first tracking state.

The method may further include predicting the first tracking state by searching for a state estimate that minimizes a measurement error with respect to a set of observations, wherein motion states specific to the ES are in a local coordinate frame. The method may further include generating a transformation to align the local coordinate frame to an inertial reference frame using a gravity vector from the IMU. The method may further include predicting a first change in orientation based on a difference between most recent predictions of the first tracking state over a time interval defined by the first rate and predicting a second change in orientation based on the second tracking state over the time interval. The method may further include predicting the second change in orientation by integrating samples of the second tracking state over the time interval. The second rate may be greater than the first rate, and a predetermined number, based on a ratio of the first rate to the second rate, of samples from the IMU may be integrated to predict the second change. The method may further include minimizing the error using an optimization algorithm.

A position and orientation tracking system for a device includes a controller, in communication with an exteroceptive sensor core that samples an exteroceptive sensor at a first rate and generates a first set of measurement data and an inertial measurement unit (IMU) that samples IMU sensors at a second rate asynchronous to the first rate and generates a second set of measurement data, programmed to track motion of the device according to a tracking state derived by synchronizing the first and second sets of measurement data to a common time domain, wherein the first and second sets of measurement data are synchronized by offsetting one of the sets by a time offset that minimizes a total error between a change in orientation of the device predicted by the first set of measurement data over a time interval defined by the first rate and a change in orientation of the device predicted by the second set of measurement data over the time interval.

The exteroceptive sensor may be a camera. The tracking state may include one or more of a position of the device, a velocity of the device, and an orientation of the device. The controller may be further programmed to update the time offset with an amount of time that minimizes a distance between motion states estimated by a model predicting device motion based on the second set of measurement data and a model predicting device motion based on the first set of measurement data that is shifted by the time offset and the amount of time. The controller may be further programmed to receive an activity type that is based on IMU data, and transfer the activity type to the exteroceptive sensor core. The controller may be programmed to receive an activity type that is based on IMU data, and change a model for estimating the tracking state based on the activity type. The controller may be further programmed to estimate the tracking state by minimizing a cost function that includes a difference between the tracking state estimated by propagating a previous tracking state derived from the second set of measurement data and the tracking state predicted by the model based on the activity type. The controller may be further programmed to perform an optimization method to minimize the total error.

An apparatus for synchronizing measurement data from an inertial measurement unit (IMU) and an exteroceptive sensor (ES) without a common electrical measurement trigger signal therebetween includes a controller, in communication with an exteroceptive sensor core that is configured to sample an exteroceptive sensor at a first rate and an inertial measurement unit (IMU) that is configured to sample IMU sensors at a second rate asynchronous to the exteroceptive sensor, programmed to predict a first change in orientation based on a difference between most recent ES orientation data over a time interval defined by the first rate, predict a second change in orientation based on IMU orientation data over the time interval, and offset measurement data from the ES by a time offset that minimizes an error between the first change and the second change such that a first time series associated with the first change and a second time series associated with the second change are aligned in time.

The controller may be further programmed to update the time offset with an amount of time that minimizes a distance between tracking states estimated by a model predicting the states based on IMU data and a model predicting the states based on exteroceptive sensor data that is shifted by the time offset. The controller may be further programmed to receive an activity type that is based on IMU data and transfer the activity type to the exteroceptive sensor core. The controller may be further programmed to perform an integration of sampled IMU data over the time interval for predicting the second change in rotation. The controller may be further programmed to estimate a tracking state of a device using the time offset to shift, in time, a signal used for generating the tracking state.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Disclosed herein is a tracking system that estimates the position and orientation of a device by fusing observations from an exteroceptive sensor and an IMU. The disclosed approach separates the exteroceptive sensor specific processing from the IMU-specific processing. This method provides a clear interface driven separation that does not require the developer to have expert knowledge of the IMU. To achieve this, a temporal synchronization and an inertial coordinate alignment algorithm are introduced that enables the alignment of measurements from the IMU and the exteroceptive sensor. A distributed state estimation approach is used in which the elimination of states specific to the exteroceptive sensor are reparametrized to be dependent on the history of position and orientation estimates. The disclosed system and methods utilize the gravity, activity sensing and bias estimation available in modern sensor hubs to provide robust state estimation. Finally, the disclosed approach presents a flexible distribution of the algorithm blocks in different computational units.

The fusion of the exteroceptive sensors with IMU enables robust tracking of highly dynamic motions. An IMU is a proprioceptive sensor that includes one or more accelerometers and gyroscopes. The IMU may be configured to measure an acceleration(s) and a rotation rate(s) of a body along/about one or more axes. With the advent of Micro-Electro-Mechanical Systems (MEMS), commercial-grade IMUs have become less expensive and widely available.

Figure 1:
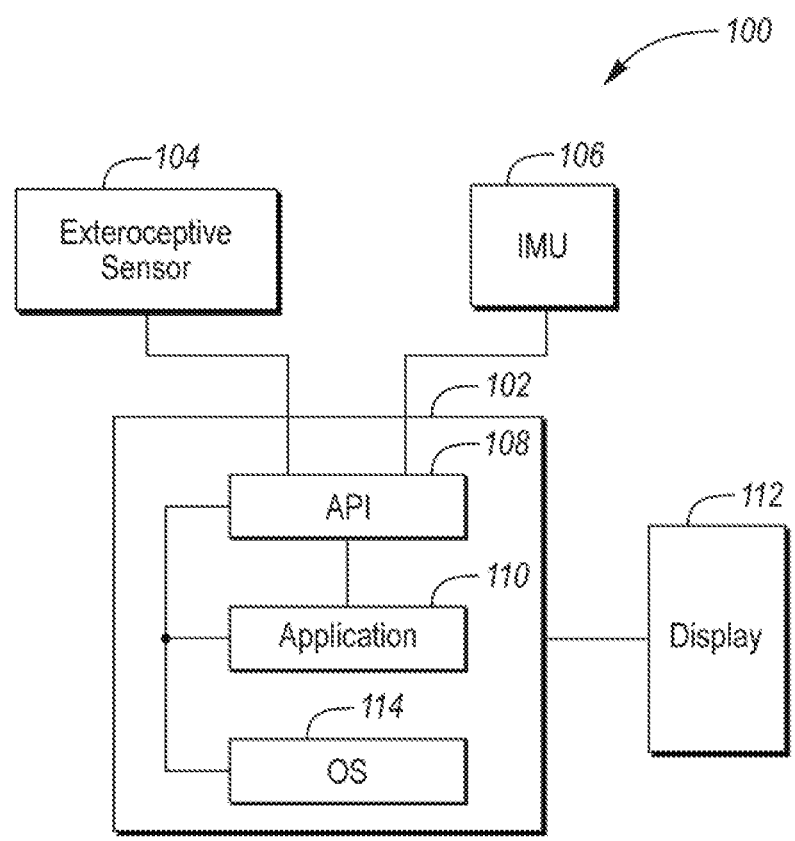
FIG. 1 depicts a possible architecture of a tracking system for a device.

FIG. 1 depicts a block diagram of a tracking system 100. The tracking system 100 may be integrated as part of a device such as a cellular phone, tablet, or robotic system. The tracking system. 100 may include an application processing unit 102. The application processing unit 102 may include a processor for executing instructions. The application processing unit 102 may include volatile and non-volatile memory for storing programs/applications and data. The application processing unit 102 may include additional inputs and outputs for communicating with external devices or components. The application processing unit 102 may store and execute an application 110. The application 110 may be a program or sequence of instructions for performing a specific set of operations. The application processing unit 102 may be a computing system such as one included in a mobile phone or tablet. The application processing unit 102 may be a controller that may be coupled to a mobile platform such as a robot.

The tracking system 100 may include a display 112 that is driven by the application processing unit 102. The display 112 may be a touchscreen or a head mounted display that provides display and input capability. The application processing unit 102 may implement an operating system (OS) 114 that is configured to manage applications that are programmed into the application processing unit 102. The operating system 114 may manage low-level features of the application processing unit 102 and provide access to the low-level features to the application 110. The application 110 may include instructions for implementing an AR and/or VR system. For example, the application 110 may be configured to position virtual objects onto an image of the nearby environment. Further, the application 110 may be programmed to reposition the virtual objects within the image as the position orientation of the device or tracking system 100 changes.

The tracking system 100 may include an exteroceptive sensor 104. The exteroceptive sensor 104 may be a global positioning system (GPS) sensor, a LIDAR, a camera, and/or a sonar sensor. The exteroceptive sensor 104 may include a sensor preprocessing core to manage the physical sensing device. The core may include a processor and memory for executing program instructions and storing data. The exteroceptive sensor 104 may be configured to transfer raw sensor data. In other examples, rather than transferring raw sensor data, the sensor preprocessing core may process observations from the exteroceptive sensor 104 to provide processed inputs to the application processing unit 102. Such processing may be specific to the associated exteroceptive sensor technology. The sensor preprocessing core may sample the corresponding sensor at predetermined time intervals.

The tracking system 100 may include an IMU 106. The IMU 106 may include a three-axis accelerometer and a three-axis gyroscope. The IMU 106 may provide acceleration and rotation rate information for each axis. The IMU 106 may include an IMU fusion core to manage the features of the IMU 106. The IMU fusion core may sample the accelerometer and gyroscope sensors at predetermined time intervals. An example of an IMU fusion core is the Bosch Sensortech BHI160. Exemplary features and functions are described in the corresponding datasheet for the device which is hereby incorporated by reference. In some examples, the IMU 106 may be integrated with the application processing unit 102 (e.g., soldered on board with a controller or processor). In other examples, the IMU 106 may be an external device that is in communication with the application processing unit 102.

The exteroceptive sensor 104 and the IMU 106 may be in communication with the application processing unit 102. The application processing unit 102 may implement an Application Programming Interface (API) 108 that is configured to manage communication and the exchange of information between the sensors (e.g., exteroceptive sensor 104 and IMU 106) and the application 110. The API 108 may define a predetermined number of interfaces or functions that can be executed by the application 110 to exchange data with the exteroceptive sensor 104 and the IMU 106.

Existing sensor fusion approaches are specialized for a particular exteroceptive sensor 104 such as GPS, LIDAR, camera, and sonar. Though it is possible to extend algorithms from one exteroceptive sensor 104 to another, such extension requires intensive hardware changes that require expert knowledge and reconfiguration of the entire system for suitable performance. Additionally, existing approaches do not separate the exteroceptive sensor-specific processing from the IMU-specific processing. This makes it challenging for a developer unfamiliar with the IMU to incorporate such tracking algorithms. The inertial-aided localization algorithm disclosed herein operates with a system architecture that does not impose hardware restrictions when used with different exteroceptive sensors including, but not limited to, a camera, a LIDAR sensor, and a sonar sensor.

Precise temporal synchronization and extrinsic calibration between the exteroceptive sensor 104 and the IMU 106 may be implemented to achieve robust sensor fusion. In some systems, the process to obtain temporal synchronization and extrinsic calibration may be closely tied to the hardware implementation. This prevents interoperability of the algorithm from one system to another. The system disclosed herein introduces specific software functionality including a temporal synchronization function and an inertial coordinate alignment function that estimates the temporal offset and the extrinsic calibration based on the measurements from the IMU 106 and the exteroceptive sensor 104. This improved approach removes the hardware requirements for temporal synchronization that require explicit trigger signals to synchronize the measurements. Additionally, the disclosed strategy removes the requirement of prior extrinsic calibration. The improved approach further allows simpler integration of different sensor units into the system.

The exteroceptive sensor-specific computations may be separated from the IMU-specific computations. This computational division provides a clear interface-driven separation that does not require the developer to have expert knowledge of the IMU 106. This division, however, splits the optimization process into two stages. In the first stage, only optimization specific to the exteroceptive sensor 104 may be performed. In the second stage, the IMU information may be merged with results from the exteroceptive sensor optimization to achieve robust tracking. The independence of the IMU optimization requirements from the exteroceptive sensor 104 allows the developer to focus on improvements to the exteroceptive sensor-specific algorithms.

The exteroceptive sensor 104 may be configured to provide data depending on the type of sensor. The exteroceptive sensor 104 may be one or more of various types of sensors, such as GPS, LIDAR, camera, and sonar. The type of output of the exteroceptive sensor 104 may depend on the type of sensor technology being employed. For example, a camera system may provide an image for processing. In other examples, a sonar or LIDAR sensor may provide information on distances to objects at various positions.

Figure 2:
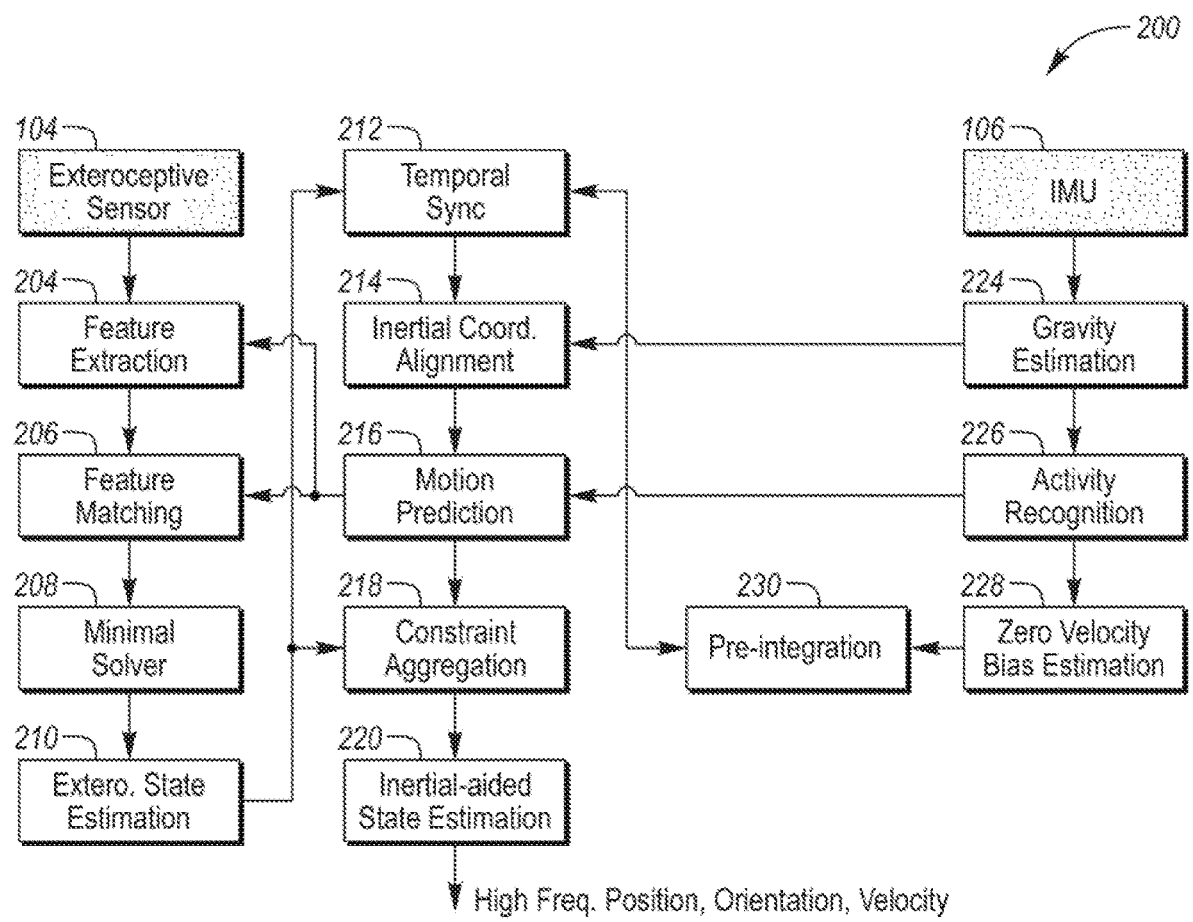
FIG. 2 depicts a block diagram for a generic inertial-aided tracking system.

FIG. 2 depicts a block diagram 200 including a possible set of processing blocks for an inertial-aided tracking algorithm that may be implemented as part of the tracking system. A feature extraction block 204 may be configured to process the observations from the exteroceptive sensor 104 to extract distinct features that can be recognized across time with changes in position and orientation. The particular feature extraction algorithm may be dependent on the particular type of exteroceptive sensor 104 that is being used. For example, the feature extraction block 204 may be configured to detect various objects or features in a field-of-view of a camera. In some configurations, the feature extraction block 204 may be implemented in the sensor preprocessing core.

A feature matching block 206 may be configured to search for matches between sensor measurements captured at different time instances and generate correspondences. The feature matching block 206 may be configured to identify the same feature at different time instances from the observation data. Feature extraction and feature matching may be improved by using predicted motion of the system or device. The predicted motion may reduce the computation time and improve the accuracy of the functions. For example, knowledge of the predicted motion of the system can be used to predict the positional movement of features identified from the observations. It may inform the feature matching block 206 where to search for the features and may narrow the search area. In some configurations, the feature matching block 206 may be implemented in the sensor preprocessing core.

A motion prediction interface may be defined to facilitate a transfer of predicted motion parameters to the feature matching block 206. For example, the interface may define a function that allows the feature matching block 206 to request and receive the predicted motion parameters. The predicted motion parameters may include device position, device orientation, velocity, and acceleration information.

A minimal solver 208 that is dependent on the dimensions of the measurements from the exteroceptive sensor 104 may be implemented to determine an initial state estimate, $X_E^0$ [$p_E^0, q_E^0$], for the exteroceptive sensor state estimation 210. The minimal solver 208 may be implemented in the application processing unit 102. The minimal solver 208 may use a subset of the observation correspondences, ($Z_E$), to estimate ($X_E^0$). The minimal solver 208 may implement numerical algorithms to estimate sensor position based on multiple observations of samples sensed and provided by the exteroceptive sensor 104. The minimal solver 208 may use the smallest possible subset of observations to generate an initial estimate for the position, orientation and the state of the system. Since the minimal solver 208 uses the smallest possible subset, it may be able to provide a quick initial estimate, however, the small subset size may lead to errors. For example, a Perspective-n-Point (PnP) algorithm can be used when a camera is used as an exteroceptive sensor 104. Similarly, other geometric solvers can be used for other exteroceptive sensors. To improve the robustness of the minimal solver, a random sample consensus scheme (RANSAC) may be implemented. The number of points or features used by the minimal solver 208 may depend on the particular strategy implemented. For example, three-point, five-point and/or eight-point strategies may be implemented.

An exteroceptive state estimation block 210 may estimate the states ($X_E$) specific to the exteroceptive sensor 104 in a local coordinate frame of the exteroceptive sensor 104. The state estimation can be performed using a filter or an optimizer. For example, Extended Kalman filtering algorithms (or variations thereof) and Nonlinear Least Squares Estimation (NLSQ) algorithms may be utilized. States of the exteroceptive sensor 104 may include a position $P=\{p_E^i|i=0:n\}$, a velocity $V=v_E^i\{i=0:n\}$, an angular velocity $\Omega=\{\Omega_E^i|i=0:n\}$, and an orientation (quaternion) $Q=\{q_E^i|i=0:n\}$ of the device. The orientation may be expressed as the quaternion or as three angles with respect to a reference. The velocity may be expressed as a vector having a magnitude and direction. States may be identified for the system/device and for landmarks, L, that are identified in the environment. The objective of the state estimation block 210 may be to minimize the measurement error given observations, $Z_E$, and a measurement covariance, $\lambda$, as follows:

$$X^*_E = \mathrm{argmin}_{X_E} \|h(X_E) - Z_E\|_\lambda \quad (1)$$

The feature extraction block 204, the feature matching block 206, the minimal solver block 208 and the exteroceptive state estimation block 210 may be implemented as part of the exteroceptive sensor processing routines.

An example of an IMU fusion core is the Bosch Sensortech BHI160. The sensors of the IMU 106 may be sampled at predetermined intervals. The sensor data from the IMU 106 may be received and processed. Some processing operations may be performed by the MU fusion core. A gravity estimation block 224 may be configured to generate a gravity vector based on observations from the IMU 106. The gravity vector may define the orientation of the IMU 106 with respect to the force of gravity.

An activity recognition block 226 may be configured to identify a high-level activity type. For example, the activity recognition block 226 may identify a motion state of the IMU 106 as stationary, in-hand running, and/or in-vehicle. Other motion states may be similarly defined. The activity may be recognized by processing the accelerometer and gyroscope data from the IMU 106. Each activity type may be sensed based on corresponding criteria. The activity recognition block 226 may process velocity and acceleration data to determine a motion state. For example, responsive to acceleration and velocity being less than corresponding thresholds, the motion state may be defined as stationary. Responsive to velocity exceeding a speed threshold, the motion state may be defined as in-vehicle. Responsive to velocity being within a predetermined range and acceleration following a predetermined profile, the motion state may be defined as in-hand running. Activity recognition may be used for predicting motion.

A zero-velocity bias estimation block 228 may be configured to estimate a bias or offset associated with the IMU 106. It may be useful to know the offset or bias of the sensors (e.g., accelerometers and gyroscopes) during stationary conditions. Due to noise and/or production tolerances, a sensor may output a non-zero value when the output should be zero. For example, when the sensor is stationary, an acceleration and/or angular rate value may be measured as a non-zero value while the expected value should be zero. The bias or offset value may be estimated and subtracted from the measured values to reduce measurement errors. The bias or offset values may be computed and stored in non-volatile memory for later use.

The gravity estimation block 224, the activity recognition block 226, and the zero-velocity bias estimation 228 may be implemented in an IMU sensor hub. The following describes fusing the exteroceptive sensor measurements and the IMU sensor measurements to improve overall performance of the system.

The exteroceptive sensor 104 and the IMU 106 may separately measure or estimate similar device motion parameters (e.g., position, orientation, speed, direction of motion). However, due to sampling differences, the motion parameters may not be aligned in time. To obtain improved tracking, the measurements may be synchronized to a common clock domain. A temporal synchronization block 212 may be implemented to synchronize the IMU sensor measurements and the exteroceptive sensor measurements. Without a common hardware trigger signal, the IMU 106 and the exteroceptive sensor 104 may not trigger measurements at the same time. The temporal synchronization block 212 may be configured to determine the time offset between measurements from the IMU 106 and the exteroceptive sensor 104. The estimated time offset may then be used to time shill the measurements from the IMU 106 or the exteroceptive sensor 104 so that the measurements can be utilized as if sampled at the same time. The exteroceptive sensor state measurements, $X_E = \{X_E^i | i=0:N\}$, may be obtained with timestamp. $\tau_E = \{t_{Ei} | i=0:N\}$, while the IMU measurements, $Z_1 = \{z_j | j=0:M\}$, are obtained with an IMU timestamp, $\tau_1 = \{t_{Ij} | j=0:M\}$.

The exteroceptive sensor 104 and the IMU sensor 106 may be sampled at different times and rates. Combining the exteroceptive sensor measurements and the IMU sensor measurements without accounting for the time difference can result in inaccuracies in the state estimation. In order to fuse the exteroceptive sensor measurements with the IMU sensor measurements, all measurements can be time shifted to a single clock domain. Some system designs may implement explicit trigger signals or shared clocks between the exteroceptive sensor 104 and the IMU 106 to force simultaneous triggering. Even with hardware synchronization, dissimilar delays are introduced during the sampling, acquisition and transfer of the measurements that are not completely accounted for. A temporal synchronization block 212 may be configured to perform time synchronization to determine a temporal offset between the sensor measurements.

Figure 3:
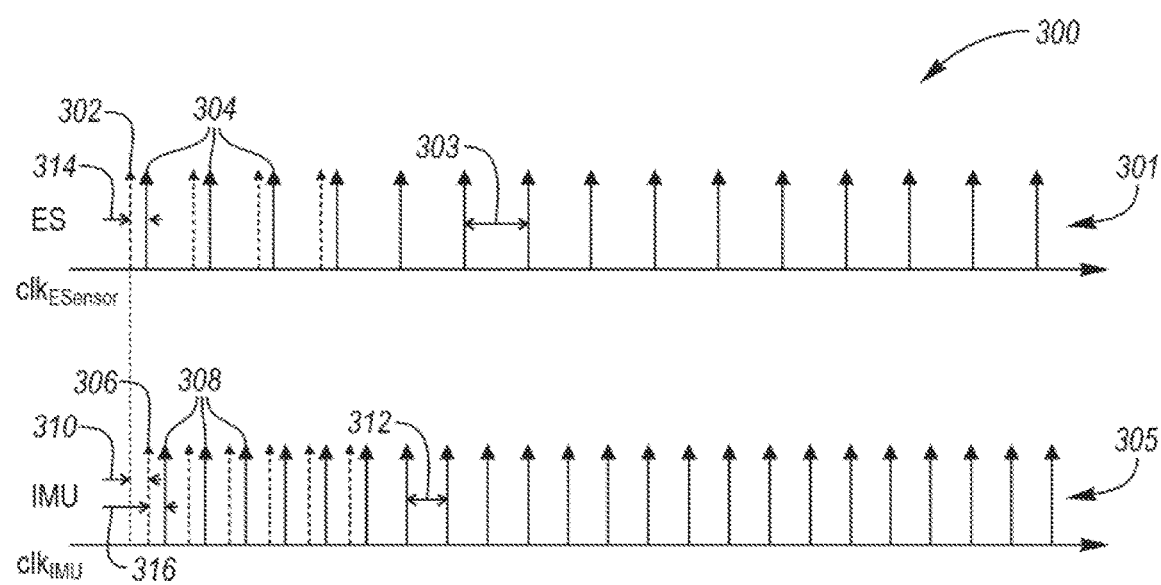
FIG. 3 depicts a possible timing diagram for sampling IMU data and exteroceptive sensor data.

FIG. 3 depicts an example timing diagram 300 that shows the sample and acquisition times for the exteroceptive sensor 104 and the IMU 106. A first timing diagram 301 depicts sample and acquisition times for the exteroceptive sensor 104. An exteroceptive sensor sampling instant 302 is shown as a dashed line. Exteroceptive sensor acquisition times 304 are shown as solid lines. The exteroceptive sensor sampling instant 302 may represent the time at which the exteroceptive sensor 104 is triggered to generate a measurement or sample. The exteroceptive sensor acquisition times 304 may represent the time at which the processing unit receives the observation and may include time for transmission of the samples to the processing unit. An exteroceptive sensor sample-acquisition (ES-SA) delay 314 may be present between the exteroceptive sensor sampling instant 302 and the exteroceptive sensor acquisition times 304. The ES-SA delay 314 may incorporate the time to trigger and gather the observation data such that the corresponding data is ready for processing. Note that the exteroceptive sensor sampling instant 302 may be present before each of the exteroceptive sensor acquisition times 304 and are not all depicted in the diagram. Each exteroceptive sensor sampling instant 302 and exteroceptive sensor acquisition time 304 may be identified by corresponding time stamps. The time stamps may be generated by latching or sampling a clock or timer value at the exteroceptive sensor acquisition times 304 and/or the exteroceptive sensor sampling instant 302.

A second timing diagram 305 depicts sample and acquisition times for the IMU 106. An IMU sensor sampling instant 306 is shown as a dashed line. IMU sensor acquisition times 308 are shown as solid lines. The IMU sensor sampling instant 306 may represent the time at which the IMU 106 is triggered to generate a measurement or sample. The IMU sensor acquisition times 308 may represent the time at which the processing unit receives the observation and may include time for transmission of the samples to the processing unit. An IMU sample-acquisition (IMU-SA) delay 316 may be present between the IMU sensor sampling instant 306 and the IMU sensor acquisition times 308. The IMU-SA delay 316 may incorporate the time to trigger and gather the observation data such that the corresponding data is ready for processing. Note that the IMU sensor sampling instant 306 may be present be fore each of the IMU sensor acquisition times 308 and are not all depicted in the diagram. Each IMU sensor sampling instant 306 and IMU sensor acquisition time 308 may be identified by corresponding time stamps.

The MU 106 and the exteroceptive sensor 104 may not be synchronized via a hardware trigger. That is, the processing unit may not trigger the corresponding observations at the same time. A sensor sampling time offset 310 may be present between the exteroceptive sensor sampling instant 302 and the sensor sampling instant 306. The sensor sampling time offset 310 may represent the difference in time at which the IMU sensor 106 and the exteroceptive sensor 104 are triggered or sampled.

The exteroceptive sensor acquisition times 302 may occur periodically separated by an exteroceptive sensor sampling time period 303. The IMU sensor acquisition times 308 may occur periodically separated by an IMU sensor sampling time period 312. The exteroceptive sensor sampling time period 303 and the an IMU sensor sampling time period 312 may be different. The exteroceptive sensor sampling time period 303 may define an exteroceptive sensor sampling frequency for acquiring, the data from the exteroceptive sensor 104 (e.g., frequency is the inverse of the time period). The IMU sensor sampling time period 312 may define an IMU sensor sampling frequency for acquiring the data from the IMU 106. The exteroceptive sensor sampling frequency may be different than the IMU sensor sampling frequency. For example, the WU sensor sampling frequency may be greater than the exteroceptive sensor sampling frequency.

Figure 4:
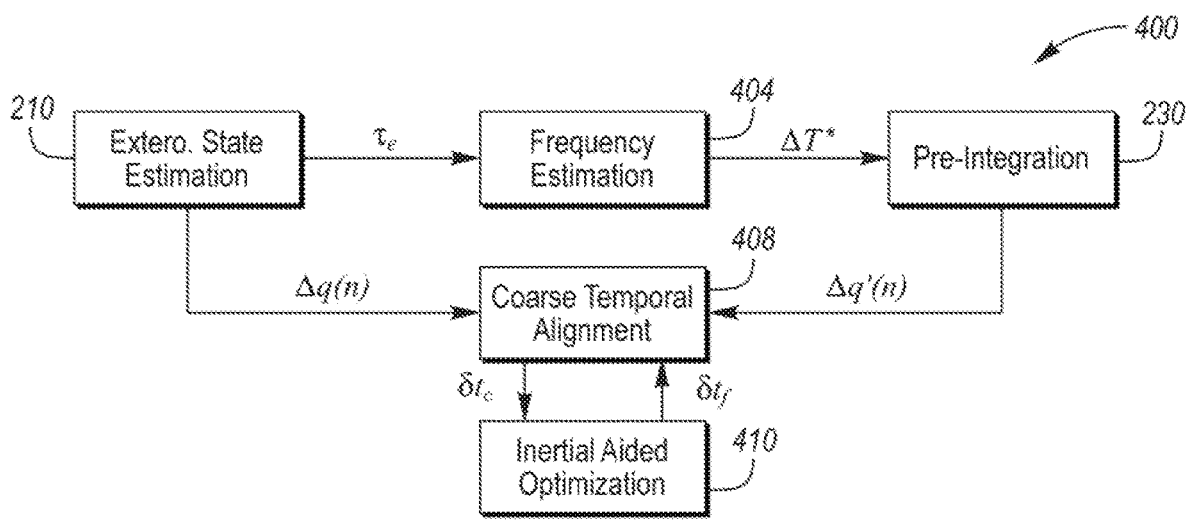
FIG. 4 depicts a block diagram for estimating the temporal alignment between states estimated by the exteroceptive sensor and the IMU.

The temporal synchronization block 212 may implement a temporal alignment process. FIG. 4 depicts a possible block diagram 400 for the temporal synchronization block 212. The exteroceptive state estimation block 210 may generate and output timestamps, $\tau_E = \{t_{E,i} | i=0: n\}$, for each measurement of the exteroceptive sensor 104. The time-stamps ($\tau_E$) may be sampled timer values representing the instants at which exteroceptive sensor measurement are triggered.

A frequency estimation block 404 may be configured to estimate a frequency of the exteroceptive sensor measurement. The exteroceptive sensor sampling time period 303 may be estimated as a difference between consecutive time stamps (e.g., $t_E[n] - t_E[n-1]$), where n is an integer denoting the sampling instant of the exteroceptive sensor 104. The frequency may be the inverse of the exteroceptive sensor sampling time period 303. The frequency estimation block 404 may use the estimated frequency to determine a time interval ($\Delta T^*$) for a pre-integration of the raw gyroscope information. The time interval may be provided to the pre-integration block 230. The time interval ($\Delta T^*$) may define a time period over which the raw IMU sensor data is to be integrated. The time interval ($\Delta T^*$) allows a consistent time interval for comparing measurements from the exteroceptive sensor 104 and the IMU sensor 106. Due to the asynchronous nature of the sampling, the motion parameters predicted by the IMU data and the ES data over the same time interval may differ.

The pre-integration block 230 may generate a $\Delta q'(n)$ value that represents the change in orientation based on IMU data over the time interval. The pre-integration block 230 may be implemented closely with the IMU sensor hub to quickly convert the raw IMU measurements (acceleration $\tilde{a}[k]$, angular velocity $\tilde{w}[k]$) to pre-integrated values based on a specified time interval ($\tau_{I0} < \tau_{jk}$). The IMU may provide sampled accelerometer and gyroscope measurements:

$$\tilde{w}[k] = s[k] + b_g[k] + \eta_g[k] \qquad (2)$$

$$\tilde{a}[k] = R_{WB}^T(a_w[k] - g_w) + b_a[k] + \eta_a[k] \qquad (3)$$

where $b_g$ and $b_a$ represent biases that affect the measurements, $\eta_g$ and $\eta_a$ represent measurement noise, and $R_{WB}^T$ represents a rotational matrix.

The IMU samples may be generated at a higher frequency than the exteroceptive sensor samples, hence the measurements between consecutive exteroceptive sensor measurements may be pre-integrated. The predicted values may be derived from a motion integration over the interval $\Delta T^*$ based on the IMU measurements sampled at $\Delta t_k$ as follows:

$$R_{k+\Delta T^*} = R_k * \Pi_{i=0:\Delta T^*} \text{Exp}(\tilde{w}[k+i] - b_g[k+i]) * \Delta t_k \qquad (4)$$

$$v_{k+\Delta T^*} = v_k + R_k \Sigma_{i=0:\Delta T^*} R_0^i(\tilde{a}[k+i] - b_a[k+i]) * \Delta t_k + g\Delta T^* \qquad {}^*5)$$

$$p_{k+\Delta T^*} = p_k + R_k \Sigma_{i=0:\Delta T^*} v_{k+i} \Delta t_k + \tfrac{1}{2} R_0^i(\tilde{a}[k+i] - b_a[k+i]) * \Delta t_k^2 + \tfrac{1}{2} g \Delta T^{*2} \qquad (6)$$

The time interval may correspond to the $\Delta T^*$ value derived from the frequency estimation. The resulting output of the pre-integration block 230 may also be represented as a change or shift in velocity $\Delta v$, a change or shift in position $\Delta p+$, and a change or shift in orientation $\Delta q'$ that can be directly incorporated into the inertial-aided state estimator. The pre-integration reduces the latency and computational requirements of the inertial-aided state estimator. The pre-integration is dependent on the integration duration $\Delta T^*$ or $(t_E[n]-t_E[n-1])$ and a local frame of reference $S_{te[n-1]}$. For example, the pre-integration may be implemented by the following equations:

$$\Delta q' = \Pi_{i=0:\Delta T^*} \text{Exp}(\tilde{w}[k+i]-b_g[k+i])^* \Delta t_k \qquad (7)$$

$$\Delta v = \Sigma_{i=0:\Delta T^*} R_0^i (\tilde{a}[k+i]-b_a[k+i])^* \Delta t_k + g \Delta T^* \qquad (8)$$

$$\Delta p^+ = \Sigma_{i=0:\Delta T^*} v_{k+i} \Delta t_k + \tfrac{1}{2} R_0^i (\tilde{a}[k+i]-b_a[k+i])^* \Delta t_k^2 + \tfrac{1}{2} g \Delta T^{*2} \qquad (9)$$

In the above equations, the IMU measurements ($\tilde{a}[n]$, $\tilde{w}[n]$) and the accelerometer and gyroscope biases $b_a$, $b_g$ provided by the IMU fusion hub may be used to estimate a change in velocity, $\Delta v$, a change in position $\Delta p^+$ and a shift in orientation $\Delta q'$. The pre-integration block 230 may provide a change in orientation as a difference between the latest values of the orientation variable. For the pre-integration computations, the time intervals associated with the n and n−1 exteroceptive sensor samples may be used.

A coarse temporal alignment block 408 may be configured to determine a coarse time offset $\delta t_c$ (e.g., sensor sampling time offset 310) between the sensors. The exteroceptive sensor state estimation block 210 may contain orientation data ($q_e$) from which the relative orientation between two consecutive exteroceptive sensor estimates ($\Delta q(n)$) is derived. The IMU sensor data may be sampled at a rate that is different than the exteroceptive sensor sampling rate. In configurations in which the IMU sensor sample rate is greater than the exteroceptive sensor sampling rate, the time interval ($\Delta T^*$) may include a number of IMU sensor samples. The exteroceptive sensor timestamps may define the start and end time values for the time interval. The pre-integration block 230 may provide an estimate of the rotation or orientation over a similar time-frame ($\Delta T^*$) based on IMU sensor data. For example, the pre-integration block 230 may integrate rotation/orientation measurements over the time interval ($\Delta T^*$) to generate a relative rotation or orientation $\Delta q'(n)$. Since the exteroceptive sensor 104 and the IMU 106 may be sampled at different rates, there may be multiple IMU sensor samples for each time interval ($\Delta T^*$). The number of samples of the IMU 106 may be based on a ratio of the sampling rate of the exteroceptive sensor 104 to the sampling rate of the IMU 106. In some cases, the we-integration block 230 may perform a partial integration for some IMU sensor samples. For example, the first and last IMU sensor samples within the time interval ($\Delta T^*$) may be partially integrated. The result may be the $\Delta q'(n)$ values corresponding to the exteroceptive sensor estimate $\Delta q(n)$ over the same time interval. Over a number of time intervals ($\Delta T^*$), the $\Delta q'(n)$ and $\Delta q(n)$ values may define a corresponding time series or waveform.

The relative orientation between two consecutive exteroceptive sensor estimates, $\Delta q(n)$, may be compared with the corresponding relative orientation, $\Delta q'(n)$, generated by the pre-integration block 230 over a number of IMU samples. The coarse temporal alignment block 408 may be performed using an optimization method/algorithm. For example, a Finite Impulse Response (FIR) filter designed in a third-order special orthogonal group (SO3) space may be implemented to determine the coarse time offset $\delta t_c$ between the sensors. Wave comparison algorithms may also be implemented to determine the coarse time offset $\delta t_c$ between the $\Delta q$ signals. The coarse temporal alignment block 408 may shill one of the relative orientation $\Delta q$ waveforms or time series to match the other. The time shift to cause the alignment of the waveforms or time series may define the coarse time offset $\delta t_c$. The time stamps of the exteroceptive sensor measurements may be corrected based on the coarse-temporal alignment. For example, the coarse time offset $\delta t_c$ may be determined by finding the minimum number of samples, $\Delta n$, required to reduce the difference between the orientation shift estimated by the IMU 106 and the exteroceptive sensor 104:

$$\Delta n = \underset{\Delta n}{\text{argmin}} \sum (\Delta q(n) \ominus \Delta q'(n + \Delta n)) \qquad (10)$$

$$\delta t_c = \Delta n \times \Delta T^* \qquad (11)$$

The system may search for the sampling offset that gives a minimal total error between $\Delta q$ estimated by consecutive exteroceptive sensor measurements and a shifted $\Delta q'$ derived from measurements of the IMU over the same interval. The system may minimize a symmetric difference between datasets represented by $\Delta q(n)$ and $\Delta q'(n \pm \Delta n)$. The $\Delta n$ represents the sampling offset between the exteroceptive sensor 104 and the IMU 106 in terms of sample numbers. The $\Delta n$ value may be an integer with positive or negative value. To convert the offset from sample number to time offset, the value may be multiplied with the time interval. Depending on the configurations, the IMU data may be shifted ahead or behind the exteroceptive sensor data. In some configurations, a buffer of orientation values may be stored to enable a search for an optimal offset.

An inertial-aided optimization block 410 may represent the remaining blocks in the process. For example, blocks 214 through 220 are related to the optimization process. The inertial-aided optimization block 410 may be configured to refine the coarse temporal alignment, $\delta t_c$, to estimate the final temporal alignment online in the optimization stage. A final time offset, $\delta t_f$, may be determined as follows:

$$\delta t_f = \underset{\delta t_f}{\text{argmin}} \|f(X, t) - f_{pred}(X, t + \delta t_c + \delta t_f)\| \qquad (12)$$

$$f(X, t) = \begin{bmatrix} p + v*\Delta t + a*\Delta t^2 \\ v + a*\Delta t \\ q*\Delta q(t) \\ b_g + \Delta b_g \\ b_a + \Delta b_a \end{bmatrix} \qquad (13)$$

The final time offset may be used in the optimization process to align the measurements to the same time frame. The f(X, t) may represent the state estimation at time t. The $f_{pred}(X, t)$ may represent a predicted state based on the activity as will be described later herein. The optimization may attempt to minimize the error or distance between the states estimated by the state estimator and the predicted activity-based state that is time-shifted by the course time offset and an additional offset. The additional time offset value that minimizes the function may be the final time offset value. The final time offset may be estimated as the amount of time that minimizes a distance between states estimated by using IMU sample data and the states predicted by the exteroceptive sensor model that is shifted by the time offset.

The temporal synchronization function 212 may be programmed into one or more of cores or processors. The temporal synchronization function 212 may be configured to synchronize, to a common time domain, measurement data from the IMU 106 and the exteroceptive sensor 104 in a system that is without a common electrical measurement trigger signal between the IMU 106 and the exteroceptive sensor 104. A processor or core implementing the temporal synchronization function may receive orientation data from the exteroceptive sensor 104 at a first rate and from the IMU 106 at a second rate. The core or processor may be programmed to predict a first change in orientation based on a difference between most recent orientation data from the exteroceptive sensor 104 over a time interval defined by the first rate. The core or processor may be programmed to predict a second change in orientation based on orientation data from the IMU 106 over the same time interval. The core or processor may offset measurement data from one of the sensor systems by a time offset that minimizes an error between the first change and the second change such that waveforms or time series associated with the first change and the second change are aligned in time.

Referring again to FIG. 2, an inertial coordinate alignment block 214 may be implemented to convert measurements from the EAU 106 and the exteroceptive sensor 104 to an inertial coordinate frame. In VR/AR applications, alignment with an inertial frame of reference enables physics-based rendering and better estimation of environment geometries due to the knowledge of a gravity vector.

Figure 5:
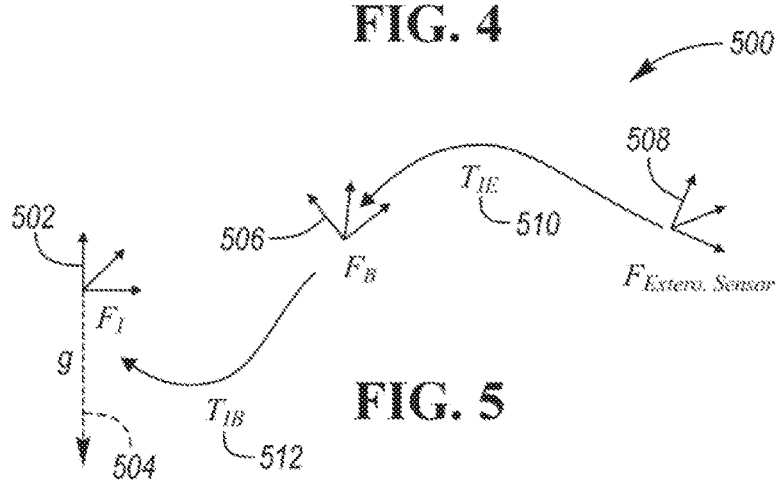
FIG. 5 depicts a possible relationship between an inertial coordinate frame, the IMU coordinated frame and the exteroceptive sensor coordinate frame.

FIG. 5 depicts a diagram of the coordinate frames that may be defined for the tracking system. In VR/AR applications, alignment with an inertial frame 502 of reference enables physics-based rendering and better estimation of environment geometries due to the knowledge of a gravity vector 504. An exteroceptive sensor coordinate frame 508 may be defined for the exteroceptive sensor 104 and is offset from the inertial frame 502. However, the initial position and orientation of the exteroceptive sensor 104 with respect to the inertial fiance 502 is not observable. As such, the position and orientation estimated by the exteroceptive sensor 104 and represented in the exteroceptive sensor coordinate frame 508 is not aligned with the inertial coordinate frame 502. An IMU coordinate frame 506 may be defined by the IMU sensor 106 and may also be offset from the inertial frame 502. It is possible to perform prior calibration between the IMU 106 and the exteroceptive sensor 104 or estimation of the gravity vector using images to align the exteroceptive sensor 104 with the inertial coordinate frame 502. An IMU-inertial frame transformation, $T_{IB}$ 512, may be determined that transforms the IMU coordinates to the inertial coordinate frame 502. For example, the IMU-inertial frame transformation, $T_{IB}$ 512, may be a matrix that is multiplied by measured values to convert the measured values to inertial frame coordinates. A transformation, $T_{IE}$ 510, between the exteroceptive sensor coordinate frame 508 and the IMU-coordinate frame 506 may be determined as the transformation that converts the measured exteroceptive sensor values to match the measured IMU sensor values.

Figure 6:
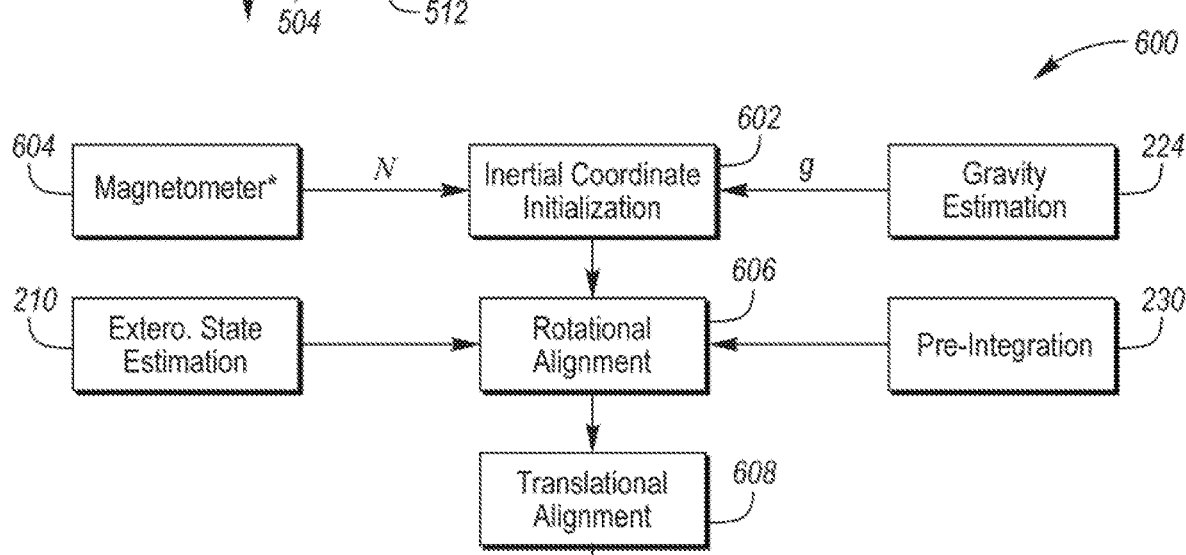
FIG. 6 depicts a block diagram for aligning IMU and exteroceptive sensor data to the inertial coordinate frame.

Referring again to FIG. 2, the system may include an inertial coordinate alignment block 214 that is configured to transform the tracking data to the inertial frame 502. FIG. 6 depicts a block diagram 600 for a possible set of features to align the coordinates to the inertial coordinate frame 502 as may be implemented as part of the inertial coordinate alignment block 214. After the temporal synchronization is performed, the alignment of the IMU 106 and the exteroceptive sensor 104 with the inertial coordinate frame 502 may be determined. An inertial coordinate initialization block 602 may receive input from the gravity estimation block 224 and a magnetometer 604 that provides a signal for orientation relative to magnetic north of the Earth. The IMU 106 measurements may be initially defined relative to the IMU coordinate frame 506. The initial alignment of the IMU 106 with the gravity vector 504 (from the gravity estimation block 224) may be performed using the gravity vector estimated by the IMU sensor hub. For example, the IMU 106 may include an accelerometer positioned to measure a vertical acceleration deceleration. When the IMU 106 is positioned on a level surface, the expected output would be the gravitational acceleration. Any deviations from the known gravitational acceleration may be the result of the IMU 106 not being level (e.g., inclined or tilted).

The magnetometer 604 may provide coordinate information for a north direction. The inertial coordinate frame 502 may be defined such that the axes have a predetermined relationship to the gravity vector and the magnetic north direction. The magnetometer signal may provide an orientation for the inertial coordinate frame 502. Knowing the orientation of inertial coordinate frame 502 and the gravity vector 504, the IMU-inertial frame transformation, $T_{IB}$ 512, may be determined. Coordinates in the IMU-coordinate frame 506 may be transformed to the inertial coordinate frame 502 by applying the IMU-inertial frame transformation, $T_{IB}$ 512. For example, the IMU-inertial frame transformation, $T_{IB}$ 512, may be expressed as a matrix and the IMU-coordinate vector may be operated on by $T_{IB}$ resulting in an inertial coordinate vector.

Next, the transformation between the coordinate system of the exteroceptive sensor 104 and the coordinate system of the IMU 106 may be estimated. A rotational alignment block 606 may receive input from the exteroceptive state estimation 210 and the pre-integration block 230. Each of the exteroceptive state estimation 210 and the pre-integration block 230 may provide an estimate of the rotational orientation (e.g., q) over a common time interval. The exteroceptive sensor 104 and the IMU 106 may be assumed to have moved in the same manner during the time interval. Any differences in the rotational movement may be due to the relative alignment of the sensors. Knowing the rotational estimates provided by both sensors, the transformation, $T_{IE}$ 510, may be computed such that by applying the transformation, $T_{IE}$ 510, to the exteroceptive coordinates results in the IMU coordinates. The exteroceptive state estimation 210 may estimate the states $X_E=[R, t, \phi_E]$ where R represents the rotation of the system with respect to the inertial frame of reference, t represents the position of the system with respect to the inertial frame, and $\phi_E$ represents the support states that are dependent on the exteroceptive sensor 104.

A translational alignment block 608 may be implemented to perform a translational alignment in a similar manner. For example, a translational transformation matrix may be determined from the translational elements (e.g. velocity and position) estimated by the exteroceptive state estimation 210 and the pre-integration block 230. The translational transformation matrix may be applied the data, resulting in estimates in the inertial coordinate frame. The transformations may be combined into a single transformation that converts state information associated with the exteroceptive sensor into the inertial coordinate frame 502.

The exteroceptive-to-IMU transformation may be defined as $T_{IE}[R_{IE}, t_{IE}]$, where $R_{IE}$ and $t_{IE}$ represent the rotational transformation and the translational offset from the exteroceptive sensor coordinate frame 508 to the IMU-coordinate frame 506. To estimate the rotational transformation, the relative rotation between two consecutive time stamps t1 and t2 obtained in the exteroceptive coordinate frame ($\Delta R_{t1-t2}^E$) and the inertial coordinate frame ($\Delta R_{t1-t2}^I$) may be used as follows:

$$\Delta R_{t1-t2}^I = R_{IE}^T \Delta R_{t1-t2}^E R_{IE} \quad (14)$$

The translational offset may be estimated by using an approach such as the Umeyama method or similar.

Referring again to FIG. 2, a motion prediction block 216 may be implemented to predict the motion of the device. The motion prediction block 216 may receive an activity input from the activity recognition block 226. The motion prediction block 216 may also be provided state information in the inertial coordinate frame 502. The motion prediction block 216 may provide additional motion estimates for each of the tracked features from the exteroceptive sensor 104. The motion prediction block 216 may further provide an output for the feature matching block 206 to facilitate tracking of features.

The temporal constraints imposed in the inertial-aided optimization may be based on the prediction model used to predict the current state based on the previous states. A continuous velocity model or a stationary motion model is commonly used. However, the modern IMU-fusion hub provides information about the activity that can be used to select the appropriate motion model to use. The activity estimated by the IMU sensor hub can be used to enable an adaptive prediction model as described below:

$$f_{pred}(X, t) = \quad (15)$$
$$\begin{cases} f'_{pred}(X, t) * \Delta T; & \text{if activity} = \text{in-vehicle} \\ 0.5 * f''_{pred}(X, t) * \Delta T^2 + f'_{pred}(X, t) * \Delta T; & \text{if activity} = \text{running} \\ f_{pred}(X, t); & \text{if activity} = \text{stationary} \end{cases}$$

The time interval between the last state and the current state may be represented as $\Delta T$. The first order and second order derivatives of the prediction model are defined as f' and f'' respectively. The change in the predicted state may be represented as $f_{pred}(X)$. This example uses three models, but additional models may be incorporated if additional activity states are defined. The states may be estimated based on the minimum of the non-linear least-squares criterion:

$$r_{imu} = f(X_{k-1}, \tilde{a}, \tilde{\omega}, \delta t_f) - f_{pred}(X_{k-1}, t, \text{activity}) \quad (16)$$

$$r_{imu} = \begin{bmatrix} p - p_{pred} \\ v - v_{pred} \\ \log(q * q_{pred}^{-1}) \\ b_g - b_{g_{pred}} \\ b_a - b_{a_{pred}} \end{bmatrix} \quad (17)$$

$$r_{ext} = h(X, t) - Z \quad (18)$$

$$X^* = \operatorname{argmin}_X \sum r_{imu}^2 + \sum r_{ext}^2 \quad (19)$$

A state estimator may be used in the inertial-aided tracking algorithm to estimate the position and orientation of the system with respect to the inertial coordinate frame 502. The state estimator, in addition to the position and orientation, may also contain additional states that are specific to the IMU 106, such as biases, and states that are specific to the exteroceptive sensor 104, such as landmark distances. This increases the number of states being estimated and thus the complexity of the state estimator. A constraint aggregation block 218 may be implemented to remove states that are only dependent on the exteroceptive sensor 104. For example, state information such as landmarks identified by the exteroceptive sensor 104 may be replaced with constraints related to past position and orientations. The states to be estimated by an inertial-aided state estimator 220 may be defined by $X_I=[p, q, t, \phi_I, E_E]$, where $\phi_I$ represents the support states that are dependent on the IMU sensor, and $E_E$ represents the states aggregated from the previous execution of the exteroceptive state estimation block 210.

The state estimation may be divided into two stages. The states supported by the exteroceptive sensor 104 may be estimated in a separate estimator and the results may be used to drive an inertial-aided state estimator 220. This separation can lead to early linearization of states and fail to capture all the correlation between the exteroceptive sensor 104 and the IMU states. However, it reduces computation complexity as it reduces the number of variables to be estimated at the same time. The constraints derived from the exteroceptive state estimator 210 may be used in the inertial-aided state estimator 220 instead of resultant states. This enables the final optimization performed by the inertial-aided tracking to indirectly incorporate the exteroceptive constraints and the proprioceptive constraints.

The state $X_E=[p_E, q_E, \phi_E]$ may be estimated by the exteroceptive state estimator 210. $\phi_E$ is composed of all the landmarks observed by the exteroceptive sensor 104. This term can easily become unbounded and is not suitable for passing to the inertial-aided state estimator 220. The states, $\phi_E$, estimated by the exteroceptive sensor 104, though represented as independent, can be reparametrized to be dependent on the history of previously estimated positions and orientations $[q_{1:n}, p_{1:n}]$. This reparameterization of the states, $\phi_E$, eliminates states that are only dependent on the exteroceptive sensor 104. Mathematically, this can be viewed as a projection of the exteroceptive sensor-only states onto the null space to remove them. For example, considering the case of landmarks in structure from motion-based tracking, the landmarks represented in the state estimation are in filet a result of a triangulation of multiple views. Landmarks may be identified or be present in successive images. Constraints between poses may exist when the same feature or landmark is present in multiple images. The constraints may be expressed without including the landmark or feature positions.

A maximum a posterior estimation may be implemented. The constraints connected by states $\phi_E$ dependent on the exteroceptive sensors 104 may be marginalized as follows:

$$X^* = \operatorname{argmax}_X P(X) = \operatorname{argmax}_{X_I} P(X_I) P(X_I, \phi_E) \quad (20)$$

$$P(X_I, \phi_E) = P(E_E) \times P(X_I | E_E) \quad (21)$$

During marginalization the constraints in $\phi_E$ are replaced by $E_E$ which has a reduced representation. The states may be assumed to be random variables and P(X) represents a probability density function for the random variable X.

Figure 7:
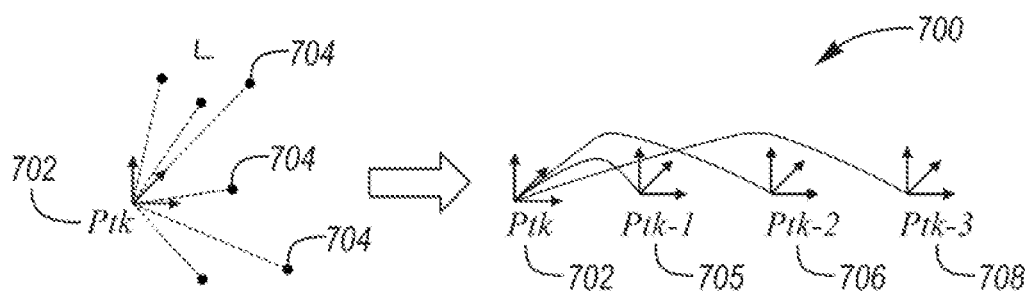
FIG. 7 depicts a diagram for elimination of states specific to the exteroceptive sensor by reparameterizing constraints to be dependent on a history of the pose estimates.

FIG. 7 is a diagram 700 depicting a reparameterization or transformation of information specific to landmarks identified by the exteroceptive sensor 104. A present camera pose 702 ($p_{tk}$) may be identified. One or more landmarks 704 in the environment may be identified relative to the present camera pose 702. Each of the landmarks 704 may be identified in different camera poses (e.g., poses at different times). Each of the landmarks 704 may be associated with a set of previous camera poses. For example, a landmark may be associated with the present camera pose 702 ($p_{tk}$), a first previous camera pose 705 ($p_{tk-1}$), a second previous camera pose 706 ($p_{tk-2}$), and a third previous camera pose 708 ($p_{tk-3}$). FIG. 7 represents the case where the landmarks 704 (L) are eliminated based on the cost by defining a constraint with respect to the current pose 702 at time $t_k$ and past position p and orientation q states. The transformation may be presented as:

$$C(L, p_{tk}, q_{tk}) \rightarrow C(p_{tk}, q_{tk}, \ldots, q_{tk-1}, p_{tk-1}) \qquad (22)$$

The constraints obtained from the exteroceptive sensor 104 may be combined with the temporal constraints provided by the IMU to estimate the final position and orientation of the device. The temporal constraint from the IMU may be estimated based on the difference between the state estimated by propagating the previous state $X_{k-1}$ using the IMU measurements and the state predicted by the prediction model $f_{pred}$. In the disclosed approach, an adaptive prediction model may be used that is dependent on the activity determined by the IMU fusion hub. In addition, a residual for the exteroceptive sensor 104 may be computed as well. The residuals may be expressed as:

$$r_{imu} = f(X_{k-1}, \tilde{a}, \tilde{w}, \delta t_f) - f_{pred}(X_{-1}, t, \text{activity}) \qquad (23)$$

$$r_{ext} = h(X, t) - Z \qquad (24)$$

$$h = \pi(K_i(R_i l_j - p_i)) \qquad (25)$$

where $l_j$ represents landmarks and its corresponding measurement on image frame i as $Z = \{z_{ij}\}$. The term $r_{ext}$ represents the reprojection error. The term $K_i \in \mathbb{R}^{3 \times 3}$ represents the intrinsic matrix, the term $R_i \in SO(3)$ represents the rotation and the term $p_i$ represents the translation. The function $\pi(x, y, z) = [x/z, y/z]$. A cost function may be defined as a function of the residuals as follows:

$$X^* = \arg\min_X \|r_{imu}\|_{\Sigma_i} + \|r_{ext}\|_{\sigma_r} \qquad (26)$$

The application processing unit 102 may be programmed to implement a strategy to minimize the cost function. Equation (26) represents a least square minimization problem that can be solved using Gauss Netwon or Lavenberg Marquert optimization techniques. The covariance associated with the IMU prediction is represented by $\Sigma_i$. The covariance associated with the exteroceptive sensor measurement is represented by $\Sigma_r$.

Modern IMU fusion hubs include an activity recognition feature that identities the motion state of a system as stationary, in-hand running, in-vehicle, etc. Similarly, the direction of the gravity vector and the IMU biases are also estimated in the IMU fusion hub. The estimation performed by the IMU fusion hub is independent of the tracking algorithm and takes into consideration the characteristics of the IMU. The IMU fusion hub provides estimates, which may be used as additional inputs to the inertial-aided tracking algorithm.

Multiple different computing units exist between the raw sensor input and the processed high frequency position and orientation output. This division of computation enables higher throughput while reducing the load on the application processor. For example, the IMU may include a processor and the exteroceptive sensor 104 may have a corresponding processor. In addition, the application processor may be executing an application that uses the tracking data and can perform processing.

Figure 8:
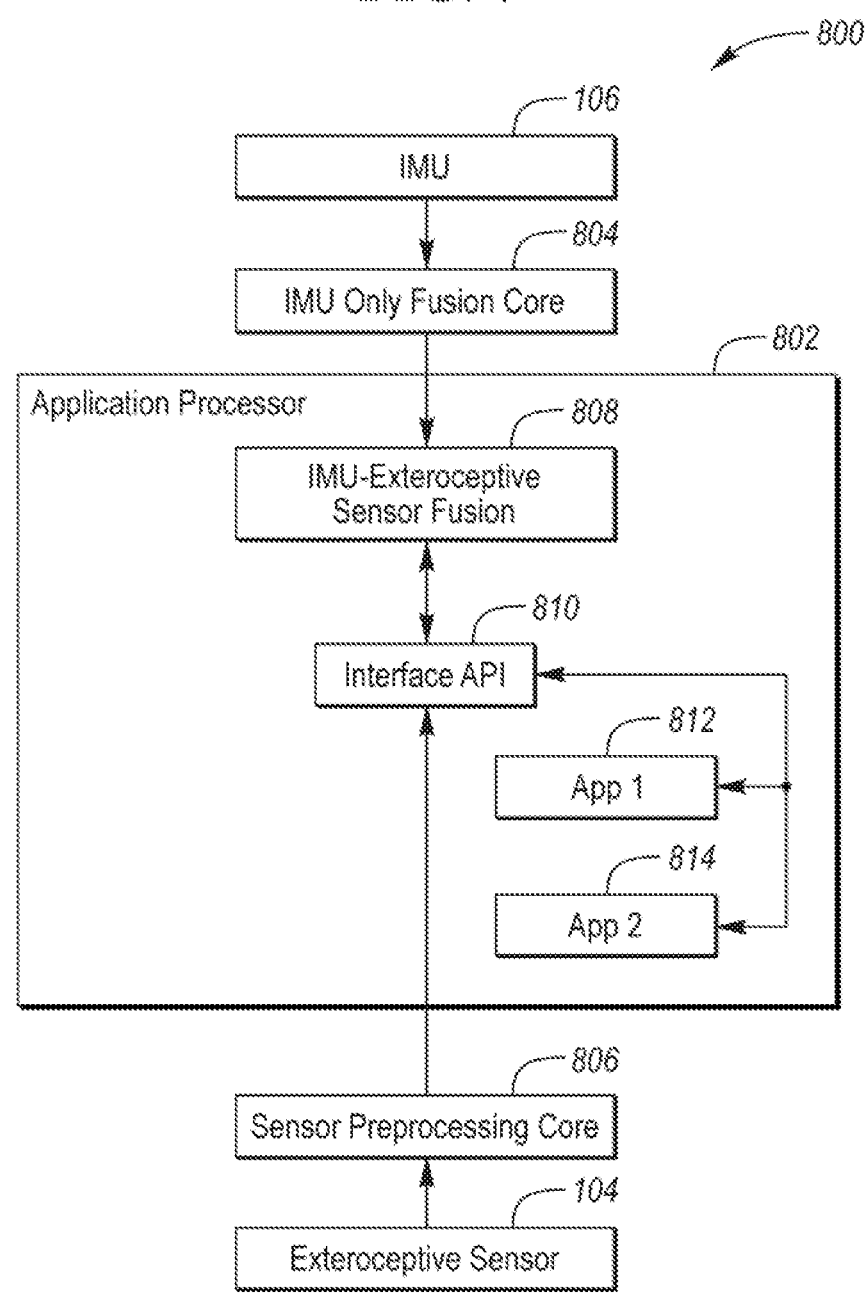
FIG. 8 depicts a possible system architecture of a mobile device.

Existing approaches often neglect the different computational units and rely on the application processor for the entire sensor fusion. However, the proposed system can be implemented to exploit an available number of computational units. FIG. 8 presents a first example system architecture 800 for a typical smartphone-based system with a dedicated IMU-only fusion core 804 such as Bosch Sensortech's BHI160 and sensor processing core 806 such as Pixel Visual core. The system architecture 800 may include the IMU 106. The system architecture 800 may include an IMU-only fusion core 804 that is associated with and/or integrated with the IMU 106. The IMU-only fusion core 804 may include a processing unit or controller that is configured to execute a program or instructions for processing measurements from the IMU 106.

The system architecture 800 may include the exteroceptive sensor 104. The system architecture 800 may include a sensor processing core 806 that is associated with and/or integrated with the exteroceptive sensor 104. The sensor processing core 806 may include a processing unit or controller that is configured to execute a program or instruction for processing measurements from the exteroceptive sensor 104. In some examples, the exteroceptive sensor 104 may be a camera that is part of a smartphone.

The system architecture 800 may include an application processor 802. For example, the application processor 802 may be a computing unit of a smartphone. The application processor 802 may be programmed with one or more application programs. For example, the application processor 802 may be programmed with a first application 812 and a second application 814. The application processor 802 may be further programmed to implement an IMU-Exteroceptive sensor fusion feature 808. The IMU-Exteroceptive sensor fusion feature 808 may be configured to implement the above described sensor fusion strategies.

The application processor 802 may be further programmed to implement an application program interface (API) 810. The interface API 810 may be configured to provide an interface between the sensor processing core 806, the IMU-Exteroceptive sensor fusion feature 808, and the first application 812 and the second application 814. The interface API 810 may define routines and interfaces for facilitating communication between the sensors and software elements.

The IMU only fusion core 804 may implement algorithms that exploit zero velocity for bias correction and gravity estimation. The output of the hardware fusion core may be fused with gravity, bias and motion state estimates. The sensor processing core 806 may be configured to perform functions such as feature extraction, feature matching, and sensor conditioning that are specific to the exteroceptive sensor 104. The IMU-Exteroceptive sensor fusion feature 808 is described above in detail herein. In this example, the IMU-Exteroceptive sensor fusion feature 808 is implemented by the application processor 802. The application processor 802 may be programmed to execute code that acts as an interface API 810 between the sensor preprocessing core 806 and the IMU-Exteroceptive sensor fusion feature 808. Having the interface API 810 on the application processor 802 increases flexibility in selection of exteroceptive sensors 104 and removes any hardware dependence for synchronization via physical wires.

Figure 9:
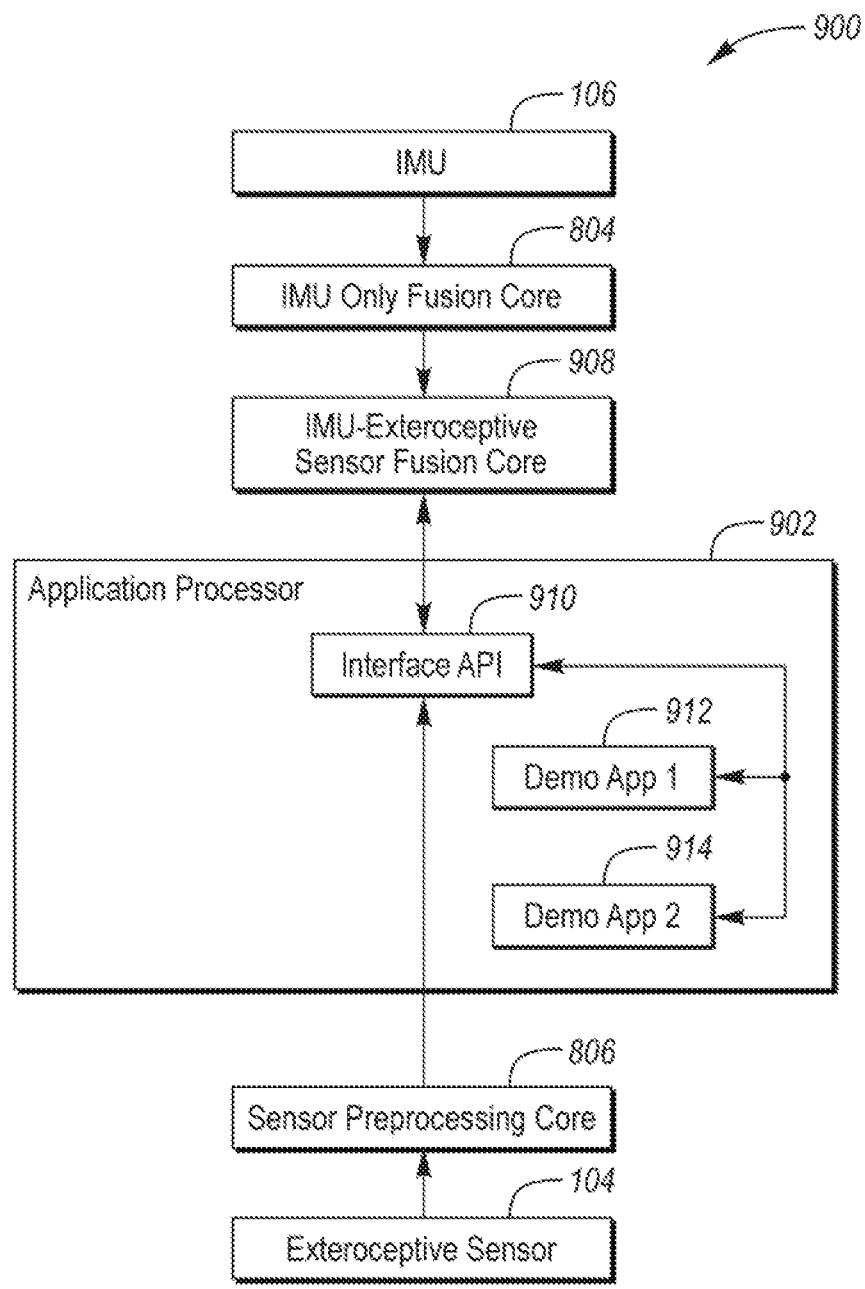
FIG. 9 depicts a possible system architecture using a dedicated IMU-exteroceptive sensor fusion core.

FIG. 9 presents a second possible architecture 900 in which the IMU-Exteroceptive sensor fusion feature is off-loaded into an IMU-Exteroceptive sensor fusion core 908. The second architecture 900 includes an application processor 902 that may be part of a smartphone. The IMU-exteroceptive sensor fusion core 908 may include a processing unit or controller that is configured to execute a program or instructions for implementing the IMU-Exteroceptive sensor fusion feature 808. The second architecture 900 removes processing overhead from the application processor 902. In some configurations, the IMU-exteroceptive sensor fusion core 908 and the IMU-only fusion core 804 may be integrated into a single unit.

The application processor 902 may be programmed with a first application 912 and a second application 914. The application processor 902 may be further programmed to implement an interface API 910. The interface API 910 may be configured to provide an interface between the sensor processing core 806, the IMU-Exteroceptive sensor fusion core 908, and the first application 912 and the second application 914.

A benefit of this configuration is that the application processor 902 (and developer/programmer) are relieved of the task of fusing the sensor data. A developer may be enabled to generate applications without having to consider the sensor fusion task. The application programs 912, 914 may access tracking data using the API 910. The API 910 provides flexibility in the selection of exteroceptive sensors and IMUs.

As an example, the features described in FIG. 2 can be executed by different processors. The feature extraction block 204 may be implemented in the sensor processing core 806. The feature matching block 206 may be implemented in the sensor processing core 806. Information regarding motion prediction may be passed through the API 910. The minimal solver 208 and constraint marginalization may be implemented in the application processor 902. Temporal synchronization 212, inertial coordinate alignment 214, motion prediction 216, constraint aggregation 218 and inertial-aided optimization 220 may be implemented in the IMU-exteroceptive sensor fusion core 908. Pre-integration 230, gravity estimation 224, activity recognition 226 and bias estimation 228 may be implemented in the IMU only fusion core 804.

Figure 10:
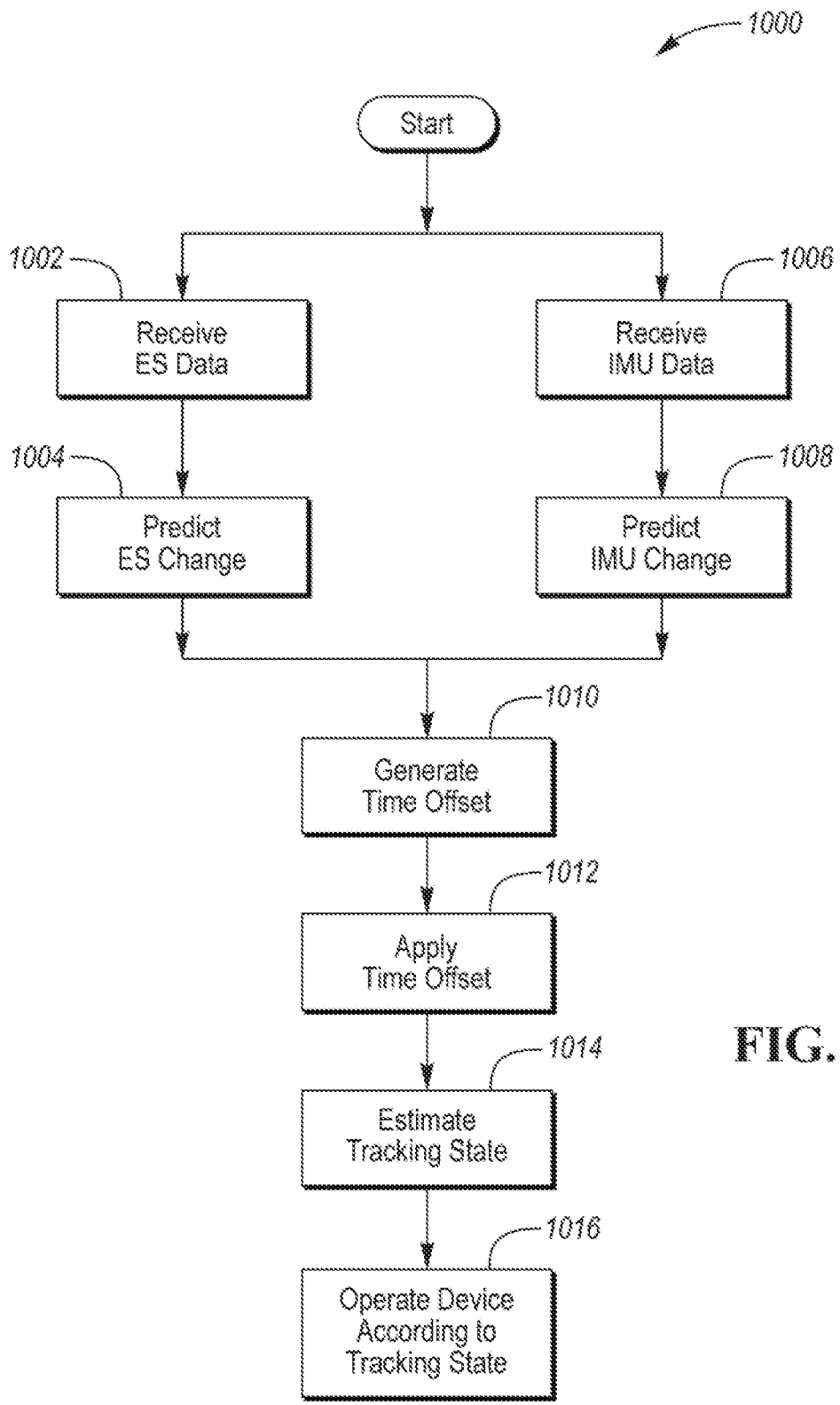
FIG. 10 depicts a flowchart for a possible sequence of operations for a position and orientation tracking system that includes synchronizing measurement data from an inertial measurement unit (IMU) and an exteroceptive sensor (ES) without a common electrical measurement trigger signal.

FIG. 10 depicts a flowchart 1000 for a possible sequence of operations for a position and orientation tracking system. At operation 1002, a controller may receive data from the exteroceptive sensor. The ES data may be received at a first rate and may include ES orientation data. At operation 1004, the controller may implement instructions to predict changes in position and orientation over a time interval based on the ES data. The change may be based on a difference between the most recent ES data over a time interval defined by the first rate. The prediction of the change may be as described previously herein. At operation 1006, the controller may receive data from the IMU. The IMU data may be received at a second rate that is asynchronous to the first rate of the ES and include IMU orientation data. At operation 1008, the controller may implement instructions to predict the changes in position and orientation over the time interval based on the IMU data.

At operation 1010, the controller may generate the time offset as described previously herein. The time offset may minimize an error between the change predicted by the ES and the change predicted by the IMU such that waveforms or time series associated with the ES and IMU predicted changes are aligned in time. In some example, the error may be minimized by using a finite impulse response algorithm. A final time offset may be estimated as an amount of time that minimizes a distance between states estimated by a model that estimates the states based on IMU sample data and a model predicting the states based on ES sample data that is shifted by the time offset. The time offset synchronizes the signals generated by the exteroceptive sensor and the IMU to a common time domain. By aligning the signals to a common time domain, the synchronized sensor output values of the sensors may represent the position and orientation of an associated device at the same time. At operation 1012, the controller may apply the time offset. For example, the time offset may be added to the time stamp of the ES data to align with the IMU data. At operation 1014, the controller may estimate the tracking state as described previously herein. At operation 1016, the controller may operate the device according to the tracking state. Operation of the device may depend on the particular application. For example, an AR/VR application may overlay virtual objects on a displayed image that includes image data of the nearby environment.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object.

Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:
1. A method for tracking position and orientation of a device comprising:
   by a controller,
   predicting a first tracking state of the device using measurements from an exteroceptive sensor (ES) sampled at a first rate;

generating a second tracking state of the device using measurements from an inertial measurement unit (IMU) sampled at a second rate that is asynchronous to the first rate;

synchronizing the first and second tracking states to a common time domain by estimating a time offset that minimizes an error between changes over time between the first and second tracking states such that a first time series associated with the first tracking state and a second time series associated with the second tracking state are aligned in time;

aligning the first tracking state and the second tracking state to an inertial reference frame; and generating an inertial-aided tracking state by minimizing a cost function that includes a first residual term derived from propagating a previous state estimate using the second tracking state shifted by the time offset and a second residual term derived from the first tracking state.

2. The method of claim 1 further comprising predicting the first tracking state by searching for a state estimate that minimizes a measurement error with respect to a set of observations, wherein motion states specific to the ES are in a local coordinate frame.

3. The method of claim 2 further comprising generating a transformation to align the local coordinate frame to an inertial reference frame using a gravity vector from the IMU.

4. The method of claim 1 further comprising predicting a first change in orientation based on a difference between most recent predictions of the first tracking state over a time interval defined by the first rate and predicting a second change in orientation based on the second tracking state over the time interval.

5. The method of claim 4 further comprising predicting the second change in orientation by integrating samples of the second tracking state over the time interval.

6. The method of claim 5 wherein the second rate is greater than the first rate, and a predetermined number, based on a ratio of the first rate to the second rate, of samples from the IMU are integrated to predict the second change.

7. The method of claim 1 further comprising minimizing the error using an optimization algorithm.

8. A position and orientation tracking system for a device comprising:
a controller, in communication with an exteroceptive sensor core that samples an exteroceptive sensor at a first rate and generates a first set of measurement data and an inertial measurement unit (IMU) that samples IMU sensors at a second rate asynchronous to the first rate and generates a second set of measurement data, programmed to track motion of the device according to a tracking state derived by synchronizing the first and second sets of measurement data to a common time domain, wherein the first and second sets of measurement data are synchronized by offsetting one of the sets by a time offset that minimizes a total error between a change in orientation of the device predicted by the first set of measurement data over a time interval defined by the first rate and a change in orientation of the device predicted by the second set of measurement data over the time interval.

9. The system of claim 8, wherein the exteroceptive sensor is a camera.

10. The system of claim 8, wherein the tracking state includes one or more of a position of the device, a velocity of the device, and an orientation of the device.

11. The system of claim 8, wherein the controller is further programmed to update the time offset with an amount of time that minimizes a distance between motion states estimated by a model predicting device motion based on the second set of measurement data and a model predicting device motion based on the first set of measurement data that is shifted by the time offset and the amount of time.

12. The system of claim 8, wherein controller is further programmed to receive an activity type that is based on IMU data, and transfer the activity type to the exteroceptive sensor core.

13. The system of claim 8, wherein the controller is programmed to receive an activity type that is based on IMU data, and change a model for estimating the tracking state based on the activity type.

14. The system of claim 13, wherein the controller is further programmed to estimate the tracking state by minimizing a cost function that includes a difference between the tracking state estimated by propagating a previous tracking state derived from the second set of measurement data and the tracking state predicted by the model based on the activity type.

15. The system of claim 8, wherein the controller is further programmed to perform an optimization method to minimize the total error.

16. An apparatus for synchronizing measurement data from an inertial measurement unit (IMU) and an exteroceptive sensor (ES) without a common electrical measurement trigger signal therebetween comprising:
a controller, in communication with an exteroceptive sensor core that is configured to sample an exteroceptive sensor at a first rate and an inertial measurement unit (IMU) that is configured to sample IMU sensors at a second rate asynchronous to the exteroceptive sensor, programmed to predict a first change in orientation based on a difference between most recent ES orientation data over a time interval defined by the first rate, predict a second change in orientation based on IMU orientation data over the time interval, and offset measurement data from the ES by a time offset that minimizes an error between the first change and the second change such that a first time series associated with the first change and a second time series associated with the second change are aligned in time.

17. The apparatus of claim 16, wherein the controller is further programmed to update the time offset with an amount of time that minimizes a distance between tracking states estimated by a model predicting the states based on IMU data and a model predicting the states based on exteroceptive sensor data that is shifted by the time offset.

18. The apparatus of claim 16, wherein the controller is further programmed to receive an activity type that is based on IMU data and transfer the activity type to the exteroceptive sensor core.

19. The apparatus of claim 16, wherein the controller is further programmed to perform an integration of sampled IMU data over the time interval for predicting the second change in rotation.

20. The apparatus of claim 16, wherein the controller is further programmed to estimate a tracking state of a device using the time offset to shift, in time, a signal used for generating the tracking state.

* * * * *